Figure 1:
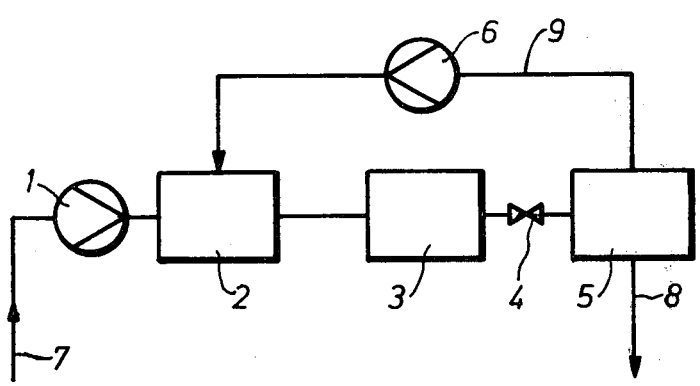

United States Patent [19]

Müller et al.

[11] 4,042,768

[45] Aug. 16, 1977

[54] CONTINUOUS SOLVENT-FREE POLYMERIZATION OF VINYL DERIVATIVES

[75] Inventors: Ernst-Willi Müller, Leverkusen; Manfred Wicke, Cologne, both of Germany

[73] Assignee: Bayer Aktiengesellschaft, Germany

[21] Appl. No.: 603,367

[22] Filed: Aug. 11, 1975

[30] Foreign Application Priority Data

Aug. 16, 1974 Germany .................................. 2439341

[51] Int. Cl.$^2$ ............................ C08F 2/02; C08F 6/26; C08F 220/42; C08F 220/14
[52] U.S. Cl. ........................................ 526/65; 526/68; 526/73; 526/88; 526/329; 526/342; 526/346
[58] Field of Search ................ 526/65, 68, 73, 88, 526/342, 346, 329

[56] References Cited

U.S. PATENT DOCUMENTS

| | | | |
|---|---|---|---|
| 2,496,653 | 2/1950 | Allen, Jr. et al. | 526/65 |
| 2,530,409 | 11/1950 | Stober et al. | 526/65 |
| 2,745,824 | 5/1956 | Melchore | 526/68 |
| 2,921,932 | 1/1960 | Erbaugh et al. | 526/73 |
| 2,931,793 | 4/1960 | Melchore | 526/65 |
| 3,052,664 | 9/1962 | Cleland et al. | 526/65 |
| 3,252,950 | 5/1966 | Terenzi et al. | 526/65 |
| 3,759,879 | 9/1973 | Floros | 526/65 |
| 3,859,268 | 1/1975 | Novack et al. | 526/65 |

*Primary Examiner*—Alan Holler
*Attorney, Agent, or Firm*—Connolly and Hutz

[57] ABSTRACT

A process for the polymerization of aromatic vinyl compounds and their copolymerization with alkyl esters or nitriles of acrylic and/or methacrylic acid, wherein 1. in a first stage, the monomer or monomers is or are continuously introduced at excess pressure into a first reaction zone and polymerized there to a degree of conversion of 5 – 40% by weight at a temperature of from 80° to 170° C;
2. in a second stage, the reaction mixture is conducted at constant pressure into a second reaction zone designed for conducting highly viscous melts, the mixture flowing through this reaction zone at a rate which is 1.1 to 5 times the intrinsic rate, and polymerized there to a degree of conversion of 40 to 95% at temperatures of from 120° to 250° C, the excess pressure in the first and second stage being chosen so that the monomer or monomers is or are liquid, and the polymer is continuously removed from this zone with release of the pressure; and
3. in a third stage, unreacted monomer is removed by evaporation, the pressure being chosen so that the monomer or monomers is or are evaporated, and the polymer is discharged as a melt.

4 Claims, 1 Drawing Figure

CONTINUOUS SOLVENT-FREE POLYMERIZATION OF VINYL DERIVATIVES

This invention relates to a continuous process for the polymerisation of aromatic vinyl compounds and the copolymerisation of aromatic vinyl compounds with alkyl esters or nitriles of acrylic and/or methacrylic acid, wherein 1. in a first stage the monomer or monomers is or are continuously introduced at superatmospheric pressure into a first reaction zone and polymerised there at a temperature of from 80° to 170° until from 5 to 40 % by weight of the starting material has been reacted;

2. in a second stage the reaction mixture is conducted at constant pressure into a second reaction zone which is adapted to transport highly viscous melts, the material passed through this zone at 1.1 to 5 times the intrinsic rate of flow and is polymerised there to a degree of conversion of from 40 to 95% at temperatures of from 120° to 250° C, the superatmospheric pressure in the first and second stage being selected so that the monomer or monomers is or are kept in a luqid state, and the polymer is continuously removed from this zone with release of pressure; and 3. in a third stage, unreacted monomers are removed by evaporation at a pressure suitably chosen to ensure their evaporation and the polymer is discharged in the form of a melt.

The process according to the invention requires no solvent.

It is particularly suitable for polymerisations in which highly viscous polymer melts or polymer solutions in the monomers are formed.

Monomers which can be polymerised without solvent by the process according to the invention include, in particular aromatic vinyl compounds such as styrene, α-methylstyrene or vinyl toluene, and $C_1$–$C_6$ alkyl esters of acrylic or methacrylic acid (e.g. ethyl acrylate, butyl acrylate or methyl methacrylate) and mixtures thereof. Other compounds which can be used as comonomers in quantities of up to 50% by weight, based on the total quantity of monomer mixture, include in particular acrylonitrile and methacrylonitrile.

Aromatic vinyl compounds are preferred, in particular their combination with up to 50% by weight, based on the total mixture, of acrylonitrile, methacrylonitrile or $C_1$–$C_6$ alkyl esters of acrylic or methacrylic acid. The copolymerisation of styrene and/or α-methylstyrene with 10–50% by weight and preferably 20–45% by weight of acrylonitrile, based on the total mixture, is particularly preferred.

Polymerisation can be started by heat or by radical initiators. Initiation by heat is preferred if the monomers are capable of thermal polymerisation.

The properties of the polymers, in particular their molecular weight and distribution of molecular weights, can be varied within wide limits by adjusting the rate of throughput, residence time and temperature conditions. By this it is possible to modify the quality of the product without interrupting the process.

It is possible in this way to produce products with a high molecular weight or with a low molecular weight (L-value about 10–300) and with a narrow or a wide molecular weight distribution (heterogeneity index $U_n$ approximately 0.5–40). These terms are defined as follows:

L-value $= \eta spec/C$ ($C = 5$ g/l; solvent dimethylformamide, temperature 20° C)

$U_n$ = heterogeneity index $= M_w/M_n - 1$ ($M_w$ = weight average $M_n$ = number average molecular weight) The molecular weight may also be adjusted by the usual molecular weight regulators. It is particularly important to adjust the rate of throughput to 1.1–5 times the intrinsic rate in the second stage. This actual rate of throughput may suitably be defined by the so-called "degree of overpumping", i.e. the ratio of actual throughput to the intrinsic rate against a pressure difference of zero.

Since the residual monomers recovered from the polymerisation process can be used again without further purification, a practically closed system is obtained. No waste air or effluent water are produced. The volume/time yields are very high.

The apparatus for carrying out the process generally consists of the following parts:

1. a dosing device for the starting material (monomers, activators, regulators) which builds up the necessary pressure, 2. a first reactor system connected with the dosing device, 3. a second reactor system connected in series with the first, if desired through a heat exchanger, and 4. apparatus for working up the product.

The term "reactor system" is used to denote the actual reactor or reactors and also the subsidiary devices.

The dosing, device which generally consists of one or more dosing pumps, is so designed that it can dose all the starting materials (monomers, regulators, activators) either individually or as a mixture into the reactor against the pressure in the system.

The first reactor system, which is designed for low viscosity material, preferably consists of a product preheater and one or more heatable and coolable stirrer tanks equipped with stirrers which sweep over or are close-fitted to the walls of the tank. These stirrer tanks are so designed that the time required for mixing the components is not more than 10% of their average residence time in the reactor. The residence time of the material in this reactor system is about 5 to 120 minutes and the viscosity of the mixture being polymerised is between 1 and 200 poises. The reaction temperatures employed are from 80° to 170° C. In this reactor system, the materials are polymerised to a degree of conversion of from 5 to 40%. The reactor system is always kept completely filled while in operation, i.e. it is flooded.

The reaction mixture is transferred from the first reactor system to the second, preferably through a heat exchanger which ensures that the mixture enters the second reactor system at a constant temperature. This second reactor system must be designed for conveying highly viscous materials and also for removing the heat of reaction and the heat of friction. Self-cleaning multi-shaft screws which have hollow shafts rotating in the same direction are particularly preferred. The heat can be removed through the wall of the screw housing and by a heat carrier flowing through the hollow shafts. A tow-shaft screw is preferably used.

The rate of throughput forced into the reactor system by the dosing device is higher than the intrinsic rate of flow through the system against a pressure difference of zero. It is 1.1 to 5 times and preferably about 1.1 to 2.2 times this rate. In other words, the reactor is operated under conditions of socalled overpumping. Under these conditions, the reaction temperature can be more easily kept constant over the whole length of the reactor system. The transfer of heat is improved and the amount of heat produced by friction within the apparatus is kept low. The reaction temperatures are from 120 to 250° C, the residence times from 2 to 15 minutes, the viscosity of the reaction mixture from 500 to 50,000 poises and the final degree of conversion into polymer from 40 to 95%.

The pressure in the two reactor systems is adjusted and kept constant by a valve system at the end of the second reactor system. The pressure is chosen so that the mixture of polymers and monomers in the reaction volume is always kept liquid.

The molecular weight distribution and molecular weight of the polymers can be influenced by suitable choice of the degree of overpumping, the ratio of the residence times in the two reactor systems and the temperature conditions in the two reactor systems. For each polymer, there is a particular degree of overpumping at which the narrowest molecular weight distribution (least non-uniformity $U_n$) is obtained. Deviations from this degree of overpumping to higher or lower values result in a wider molecular weight distribution.

Moreover, the closer the ratio of the residence times in the two reactor systems approaches the value 1, the narrower is the molecular weight distribution obtained. The same effect is also achieved by approximating the temperatures in the two systems to each other.

The molecular weight can be reduced by increasing the reaction temperature.

The largely polymerised material leaving the second reactor system is transferred to a working up apparatus. The polymer is first continuously removed from the second reactor system and at the same time released from pressure, and is then heated to remove unreacted monomers. The apparatus used for working up the product may be thin layer evaporators or evaporator screws or a combination of the two. Thin layer evaporators are used on their own when the viscosity of the product is not above 50,000 poises. The advantage of these evaporators is that they subject the polymers to heat for only a short time. Screws are preferred for more highly viscous products. A pressure of from about 10 to 2000 Torr and preferably from about 30 to 100 Torr is generally employed in the evaporation chamber. The unreacted monomers are removed from the polymer at this stage. They can immediately be returnd to the process. The polymers obtained are practically free from monomers. The polymer, which is initially obtained as a solvent-free melt, can be worked up in the usual manner. For example it may be extruded and granulated.

A schematic representation of the apparatus for carrying out the process is shown in the accompanying drawing. The various reference numerals in the figure have the following meaning:
(1) the dosing device
(2) the first reactor system
(3) the second reactor system
(4) a valve system for releasing the pressure
(5) the working up apparatus
(6) pump device for returning unreacted monomers
(7) inlet for starting materials
(8) outlet for polymer
(9) conduit for unreacted monomers.

EXAMPLES

The following general description is applicable to all the Examples.

The reactants are delivered by piston feed pumps at the rates shown in the Table and combined in a T-joint shortly before entering the monomer preheater. They then flow through the preheater where they are heated to a temperature of about 85° C before entering the first reactor system. This system consists of a stirrer vessel with an anchor agitator conforming to the walls of the vessel (speed of rotation 80 to 100 revs/min; ratio of height to diameter of the vessel is 1.2 to 1.5). This reactor is operated under conditions of flooding. The reaction mixture enters at the bottom and is discharged from the top. The temperature, conversion rate and volume can be seen from the Table.

The reaction mixture is transferred to the second reactor system through a heat exchanger which is adjusted to the reaction temperature in the following two-shaft screw (second reactor system).

Final conversion of the starting materials is achieved in this second reactor system at the temperatures indicated (see Table). The second reactor system consists of a self-cleaning two-shaft screw with an internal volumetric capacity of about 9 l, a ratio of length : diameter of 10 and a heat transfer surface of 1 m² (manufacturer: Thies, Model 2 W 100/1000). The speed of rotation of the double shaft is adjusted to fulfil the condition indicated in the Table (see 1).

The outlet from the second reactor system leads directly to a conventional pressure retaining valve. In Example 1, the valve is adjusted to a pressure of 15 bar, i.e. this pressure is maintained in the part of the system extending from the feed pumps to this point.

The output end of the pressure retaining valve is directly connected to the input of a high viscosity thin layer evaporator (manufacturers: Luwa, Model HS 150/1000) in which unreacted monometers are evaporated. The monomers are condensed and returned to the polymerisation process. The polymer melt now freed from monomers is discharged through an extruder and granulated.

The following Table shows the operating conditions for the individual experiments and the properties of the products obtained.

The references in the Table have the following meaning:
a. Example number
b. rate of throughput of monomer in kg/h
c. activator % by weight, based on monomers
d. regulator % by weight, based on monomers
e. volume of first reactor system in liters
f. temperature in °C in the first reactor system
g. degree of conversion in % by weight in the first reactor system
h. pressure in the reactor systems in bar
i. temperature in °C in the second reactor system
j. additional degree of conversion rate in % by weight in the second reactor system
k. volume/time yield in the second reactor system in kg/l.h
l. degree of overpumping
m. total yield in kg/h
n. L-value of the polymer
o. non-uniformity of the polymer ($U_n = M_w/M_n - 1$)
The following monomers were used:

In Examples 1 – 11, 15 and 16: a mixture of 75% by weight of styrene and 25% by weight of acrylonitrile.

In Example 12: styrene

In Example 13: A mixture of 60% by weight of styrene and 40% by weight of acrylonitrile (polymer composition: 67% by weight of styrene and 33% by weight of acrylonitrile)

In Example 14: a mixture of 30% by weight of styrene, 30% by weight of α-methylstyrene, 30% by weight of acrylonitrile and 10% by weight of methyl methacrylate.

The following activators were used:
in Examples 1, 3-5 and 14: azodiisobutyronitrile
in Example 15: cyclohexylpercarbonate
in the other Examples: no activator.

The following regulators were used:
in Examples 8 and 14: dodecylmercaptan
in Example 16: butyl mercaptan
in the other Examples: no regulator.

Table

| a | b | c | d | e | f | g | h | i | j | k | l | m | n | o |
|---|---|---|---|---|---|---|---|---|---|---|---|---|---|---|
| 1 | 120 | 0.05 | — | 66 | 100 | 20 | 13 | 220 | 60 | 8.8 | 1.2 | 67 | 85 | 18 |
| 2 | 120 | — | — | 66 | 105 | 19 | 13 | 220 | 60 | 8.8 | 1.2 | 67 | 83 | 20 |
| 3 | 74 | 0.006 | — | 66 | 100 | 16 | 12 | 195 | 50 | 4.4 | 1.4 | 65 | 80 | 30 |
| 4 | 74 | 0.006 | — | 66 | 95 | 14 | 12 | 190 | 53 | 4.5 | 1.3 | 48 | 90 | 11 |
| 5 | 56 | 0.002 | — | 66 | 105 | 16 | 13 | 170 | 40 | 2.8 | 1.2 | 31 | 98 | 5.5 |
| 6 | 50 | — | — | 45 | 125 | 17 | 13 | 160 | 43 | 2.9 | 1.2 | 30 | 95 | 3.7 |
| 7 | 50 | — | — | 21 | 135 | 17 | 13 | 150 | 43 | 2.9 | 1.1 | 30 | 100 | 2.6 |
| 8 | 50 | — | 0.12 | 21 | 142 | 20 | 12 | 150 | 36 | 2.2 | 1.1 | 28 | 63 | 1.6 |
| 9 | 50 | — | — | 21 | 143 | 20 | 13 | 150 | 36 | 2.2 | 0.5 | 28 | 75 | 3.0 |
| 10 | 50 | — | — | 21 | 143 | 20 | 13 | 150 | 36 | 2.2 | 1.8 | 28 | 70 | 2.1 |
| 11 | 50 | — | — | 21 | 143 | 20 | 13 | 50 | 36 | 2.2 | 3.0 | 28 | 68 | 4.2 |
| 12 | 50 | — | — | 21 | 145 | 20 | 11 | 150 | 40 | 2.4 | 1.2 | 30 | 78 | 2.2 |
| 13 | 50 | — | — | 21 | 148 | 20 | 15 | 150 | 42 | 2.6 | 1.1 | 31 | 72 | 2.3 |
| 14 | 50 | 0.006 | 0.03 | 21 | 150 | 18 | 12 | 155 | 42 | 2.6 | 1.1 | 30 | 70 | 2.5 |
| 15 | 74 | 0.005 | — | 66 | 100 | 16 | 12 | 195 | 50 | 4.4 | 1.4 | 65 | 80 | 30 |
| 16 | 50 | — | 0.05 | 21 | 143 | 20 | 13 | 151 | 37 | 2.2 | 1.1 | 29 | 65 | 1.7 |

We claim:

1. A process for the polymerization of at least one aromatic vinyl monomer which comprises the steps of:
   1. in a first stage, continuously introducing monomer feed under elevated pressure into a first reaction zone which is flooded and is always kept completely filled with liquid phase mixture of monomer and polymer thereof and polymerizing said monomer to a degree of conversion, based on total monomer feed, of from 5 to 40% by weight at a temperature of from 80° to 170° C.;
   2. in a second stage, conducting the reaction mixture from the first stage at the same pressure into a second reaction zone which is also completely filled with said liquid phase mixture and operated under conditions of over-pumping and which is adapted to conduct highly viscous melts therethrough, the mixture flowing through the second reaction zone at a rate which if from 1.1 to 5 times the intrinsic rate, and polymerizing the mixture in the second reaction zone to a degree of conversion, based on total monomer feed, of from 40 to 95% by weight at a temperature of from 120° to 250 ° C., the pressure in the first and second stages being selected so that the monomer feed is liquid, and continuously removing polymer from the second reaction zone by passing it to a zone of reduced pressure and
   3. in a third stage, removing unreacted monomer from the removed polymer by evaporation.

2. A process according to claim 1, wherein styrene and from 20 to 45% by weight of acrylonitrile, based on the total mixture, are copolymerized.

3. A process according to claim 1, wherein the reaction zone designed for conveying highly viscous melts in the second stage is a self-cleaning multishaft screw with hollow shafts rotating in the same direction.

4. A process according to claim 1, wherein said rate of throughput is from 1.1 to 2.2 times the intrinsic rate.

* * * * *